No. 729,786. PATENTED JUNE 2, 1903.
E. F. McDANIEL.
ANIMAL TRAP.
APPLICATION FILED NOV. 10, 1902.
NO MODEL.
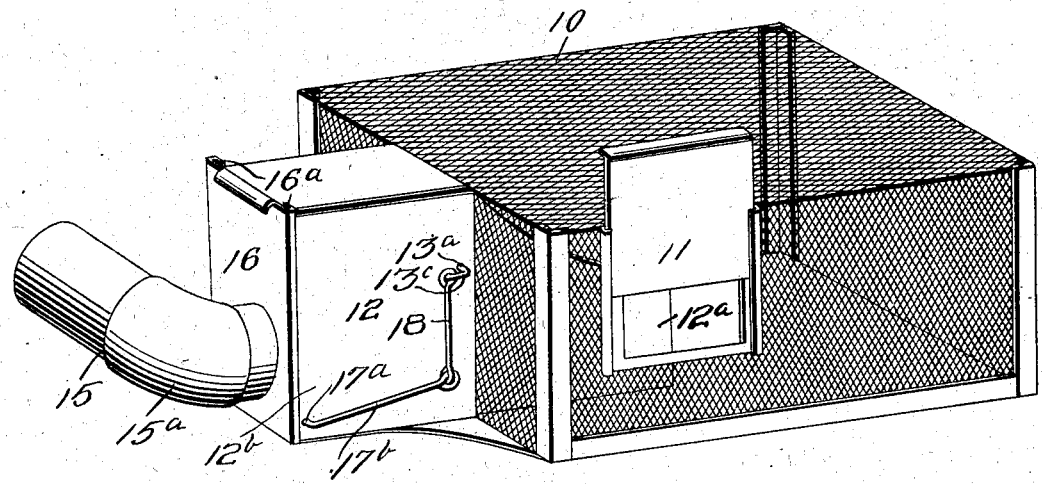
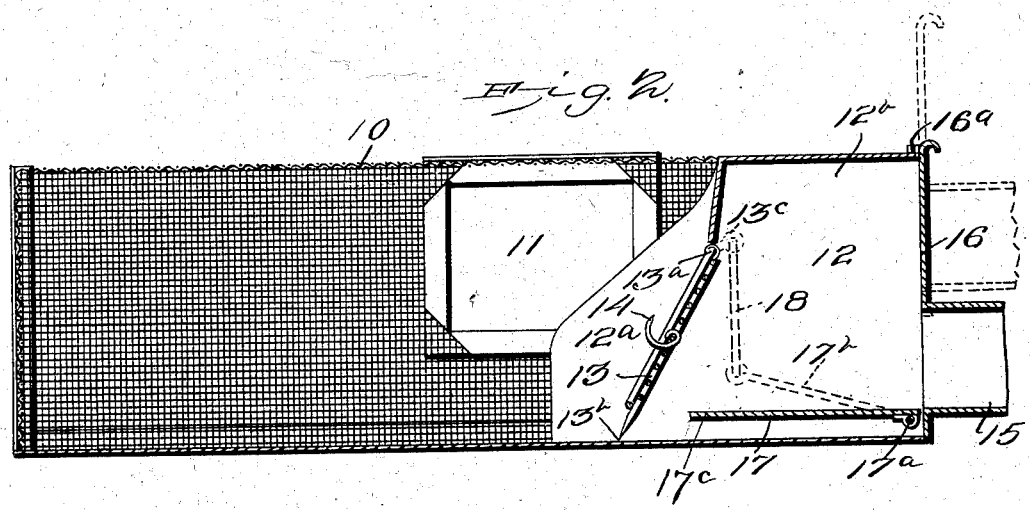
Witnesses
E. F. McDaniel, Inventor
by
C. A. Snow & Co
Attorneys No. 729,786. Patented June 2, 1903.

UNITED STATES PATENT OFFICE.

EDWARD F. McDANIEL, OF OTISCO, INDIANA, ASSIGNOR OF ONE-HALF TO ARNIE C. SCHLICHTER, OF OTISCO, INDIANA.

ANIMAL-TRAP.

SPECIFICATION forming part of Letters Patent No. 729,786, dated June 2, 1903.

Application filed November 10, 1902. Serial No. 130,707. (No model.)

*To all whom it may concern:*

Be it known that I, EDWARD F. MCDANIEL, a citizen of the United States, residing at Otisco, in the county of Clark and State of Indiana, have invented a new and useful Animal-Trap, of which the following is a specification.

This invention relates to animal-traps, and has for its object the production of a trap wherein the bait is secured upon the main surface of an inwardly-swinging wire-cloth or other open-mesh door or guard, whereby the animal is forced to operate the door and enter the trap before it can secure the bait.

Another object of the invention is to produce a trap having an inwardly-swinging open-mesh entrance-door, with the bait disposed upon the inside of the door and a movable floor or trip connected to operate said door when the animal depresses said trip-floor.

Other objects of the invention will appear in the following description and be specified in the claims.

The device is adapted to be employed to trap any species of animals, from the larger species—such as bears, panthers, and the like—to the smaller, such as squirrels, weasels, rats, mice, and the like.

The trap will be constructed to correspond to the strength of the animal to be trapped. If for the larger animals, the walls of the cage will be made of steel bars or other suitable material, and if for the smaller animals the walls will be made of wire-cloth or other similar material. For the purposes of illustration the cage is shown in the drawings formed of wire-cloth, as in the smaller sizes of the trap.

Figure 1 is a perspective view of the trap complete, and Fig. 2 a longitudinal vertical section.

The cage or receptacle is represented at 10, with a movable closure 11, through which the bait will be inserted. Attached to one side of the cage is a "runway" 12, extending into the cage, as at 12$^a$, and also extending outwardly from the cage, as at 12$^b$. Within the runway is supported an inwardly-swinging door 13, being hinged upon a rod 13$^a$ to the runway and lying loosely upon the bottom of the runway, as at 13$^b$, and preferably inclined inwardly, as shown.

The door 13 will preferably be formed of the same material as the walls of the cage or otherwise formed to freely admit light, and at the same time be strong enough to resist the efforts of the animal to escape. The lower edge of the door 13 will be pointed or formed of sharp spikes, which will not offer any resistance to the animal in passing into the cage, but which will effectually prevent any backward movement in event of any attempt to return when in contact with the door.

Upon the inner side of the door 13 means will be provided, such as a hook 14, to support bait, so that it will be necessary for the animal to enter the cage and pass entirely from beneath the door and allow the latter to close by gravity before it can get the bait. The door being formed of open bars, the bait will be in plain view from inside the runway and will be so near to the animal that it will be naturally induced in its efforts to get at it to push against the door and pass beneath it into the cage. The trap is thus very effective in inducing the animal to enter the cage, and nothing of a suspicious or terrifying nature is present to warn the animal of danger.

Attached movably upon the entrance of the runway 12 is a tubular projection 15, preferably with a movable elbow 15$^a$, and adapted to be placed in the inlet to the burrows or dens of the animals, so that in their efforts to pass from their dens they will pass into the trap, and by which means they will not be able to leave their dens except by passing into the trap.

By providing the projection 15 with the elbow 15$^a$ the outer end of the projection is made laterally adjustable and it can be readily adapted to any irregularity in the entrance to the den or burrow.

The cage 10 and the door 13 being of the open-work shown and freely admitting the light, when the trap is set in engagement with the animal's den or burrow the presence of the trap will not be noticeable to the animal, and the trap will therefore not be liable to frighten cautious, wary, or timid animals.

The tubular extension 15 will be attached to a plate 16, slidably disposed, as by guides 16ª, upon the outer end of the runway 12, so that it can be elevated, as in Fig. 2, when not required, or removed altogether, as may be preferred.

When employed to trap animals running loose, the tubular extension will not be required and may be either elevated, as in Fig. 2, or removed, as before stated.

In the lower part of the runway 12 is a trip floor or plate 17, hinged at its outer end, as shown, upon a transverse rod 17ª, the latter having an arm 17ᵇ, connected by a link 18 to a shorter arm 13ᶜ, extending from the hinge-rod 13ª of the door 13. The arms 17ᵇ and 13ᶜ and the link 18 will be so disposed that the inner end 17ᶜ of the trip-plate 17 will be supported a short distance above the bottom of the runway, as shown in Fig. 2, and the arm 17ᵇ will be comparatively long and the arm 13ᶜ will be comparatively short, so that a very slight downward movement of the trip-plate 17 will be sufficient to open the door 13 its full distance. Moreover, the hinge of the trip-plate 17 being at the entrance end or at the point where the animal first engages the plate, the downward movement near the hinge will be so very slight that cautious and wary animals will not notice the very slight motion, and the door 13 will therefore be fully open before they are attracted by its movement, hence will be induced to freely enter the cage. This makes a very complete, simple, and effective trap, and, as before stated, can be readily adapted to all species of animals, whether large or small. It will be found especially valuable in trapping fur-bearing and other valuable animals, as absolutely no damage will be done to the fur. It will also be found very valuable in trapping animals which it is desired to capture alive and uninjured.

Having thus described the invention, what is claimed as new is—

1. An animal-trap comprising a cage, an inwardly-opening door leading to said cage, and means for attaching bait to the inner side of said door, whereby the animal can gain access to the bait only by operating the door and entering the cage, substantially as shown and described.

2. An animal-trap comprising a cage, a runway leading into said cage, an inwardly-swinging door within said runway and affording the means of inlet into said cage, and means for attaching bait to the inner side of said door, substantially as shown and described.

3. An animal-trap comprising a cage, an inwardly-opening door leading to said cage and having spikes extending from its free end, and means for attaching bait to the inner side of said door, whereby the animal can freely pass beneath said door in entering said cage but cannot move backward therefrom and can gain access to said bait only by entering said cage, substantially as shown and described.

4. In an animal-trap, a cage, a runway leading into said cage, an inwardly-swinging door at the inner end of said runway and forming a movable closure thereto, a trip-plate extending into said runway and pivotally connected at the outer end thereof, a comparatively long arm extending from said trip-plate and a comparatively short arm extending from said door, and a link connecting said arms, whereby a slight depression of said trip-plate will actuate said door, substantially as shown and described.

5. In an animal-trap, a cage, a runway leading into said cage, an inwardly-opening trap-door at the inner end of said runway, and a tubular projection detachably connected to the inlet end of said runway and adapted to be engaged with the entrance to the burrows or dens of the animals, substantially as shown and described.

6. In an animal-trap, a cage, a runway leading into said cage, an inwardly-opening trap-door at the inner end of said runway, and a tubular projection attached movably to the inlet end of said runway and laterally adjustable at its outer end to enable it to be adapted to the burrows or dens of the animals, substantially as shown and described.

In testimony that I claim the foregoing as my own I have hereto affixed my signature in the presence of two witnesses.

EDWARD F. McDANIEL.

Witnesses:
ERNEST PARK,
O. L. KIRK.